(12) United States Patent
Kitano et al.

(10) Patent No.: US 8,562,146 B2
(45) Date of Patent: Oct. 22, 2013

(54) LIGHT SOURCE DEVICE AND IMAGE DISPLAY APPARATUS

(75) Inventors: Hiroshi Kitano, Hyogo (JP); Takaaki Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 215 days.

(21) Appl. No.: 13/277,880

(22) Filed: Oct. 20, 2011

(65) Prior Publication Data
US 2012/0127435 A1 May 24, 2012

(30) Foreign Application Priority Data

Oct. 21, 2010 (JP) ................................. 2010-236167

(51) Int. Cl.
*G03B 21/14* (2006.01)
(52) U.S. Cl.
USPC .................................. 353/84; 353/31; 362/84
(58) Field of Classification Search
USPC ............ 353/20, 31, 34, 37, 84; 348/742, 743, 348/771; 362/614, 84
See application file for complete search history.

(56) References Cited

U.S. PATENT DOCUMENTS

| | | | |
|---|---|---|---|
| 7,547,114 B2 | 6/2009 | Li et al. | |
| 2009/0284148 A1 | 11/2009 | Iwanaga | |
| 2010/0328632 A1 | 12/2010 | Kurosaki et al. | |
| 2012/0081674 A1 * | 4/2012 | Okuda | 353/20 |
| 2012/0140183 A1 * | 6/2012 | Tanaka et al. | 353/20 |
| 2012/0242912 A1 * | 9/2012 | Kitano | 348/759 |
| 2012/0300178 A1 * | 11/2012 | Sugiyama et al. | 353/31 |
| 2012/0327374 A1 * | 12/2012 | Kitano et al. | 353/31 |
| 2013/0021582 A1 * | 1/2013 | Fujita et al. | 353/31 |
| 2013/0135592 A1 * | 5/2013 | Okuda | 353/31 |
| 2013/0176540 A1 * | 7/2013 | Wei et al. | 353/20 |

FOREIGN PATENT DOCUMENTS

| | | |
|---|---|---|
| JP | 2004-341105 | 12/2004 |
| JP | 2009-277516 | 11/2009 |
| JP | 2011-013313 | 1/2011 |

* cited by examiner

*Primary Examiner* — William C Dowling
(74) *Attorney, Agent, or Firm* — Hamre, Schumann, Mueller & Larson, P.C.

(57) ABSTRACT

A light source device includes a phosphor layer formed on a base, and an excitation light source exciting the phosphor. A dichroic mirror is arranged between the phosphor layer and the excitation light source and inclined with respect to a propagation direction of excitation light from the excitation light source. An incident region of the excitation light and an exiting region of fluorescence emitted from the phosphor belong to a space on the same side with respect to the surface with the phosphor layer disposed. In a dominant wavelength of the excitation light, the dichroic mirror has a spectral characteristic of transmitting 50% or more of light of a p-polarized component and reflecting 50% or more of light of a s-polarized component. Fluorescence emitted from the phosphor layer can be extracted highly efficiently and propagated by a compact and simple optical system.

17 Claims, 10 Drawing Sheets

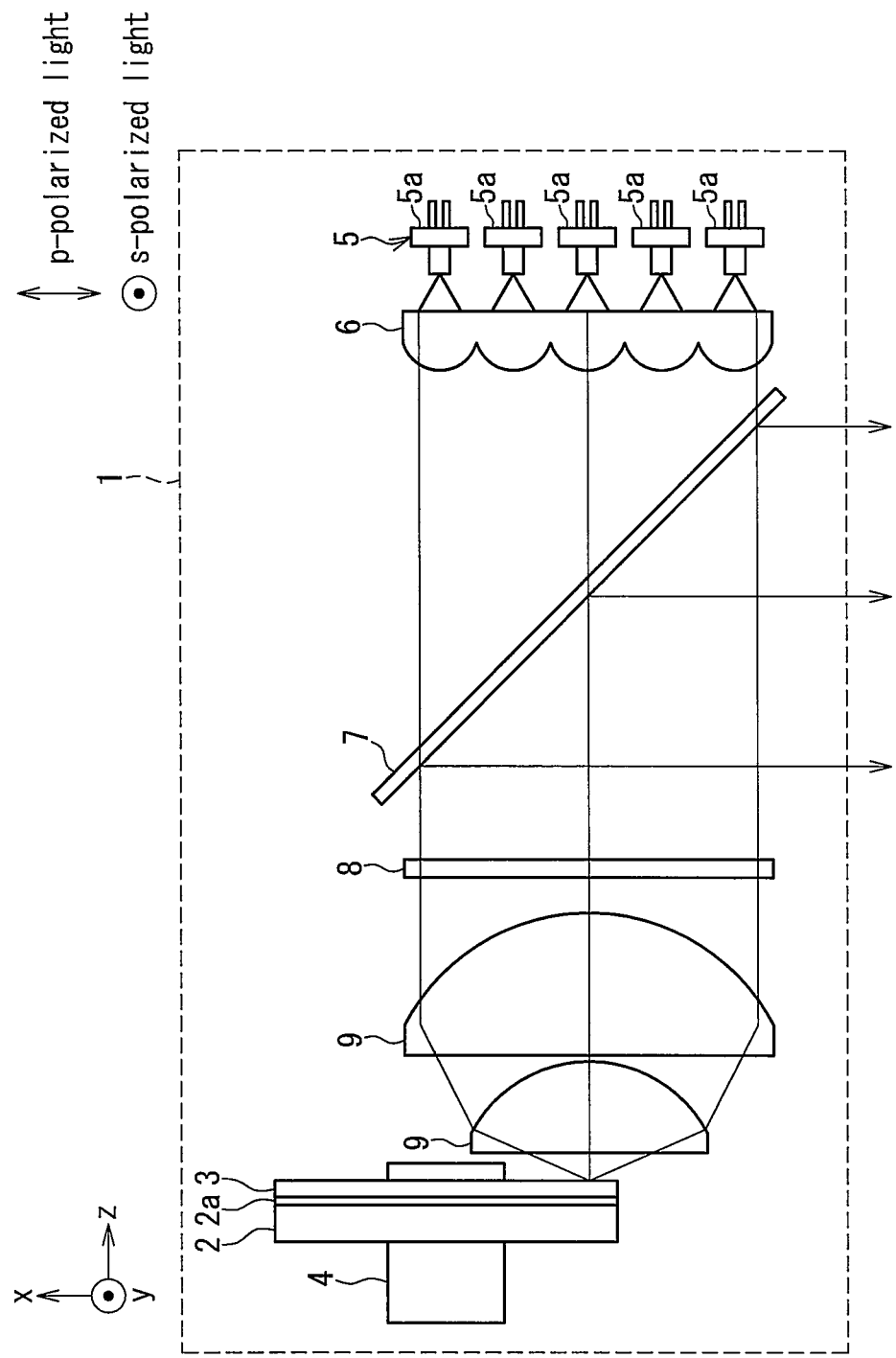

LIGHT SOURCE DEVICE AND IMAGE DISPLAY APPARATUS

BACKGROUND OF THE INVENTION

1. Field of the Invention

The present invention relates to a light source device using fluorescence emitted from a phosphor by excitation light, and in particular to a light source device emitting visible light of red, green and blue for use in an image display apparatus.

2. Description of Related Art

Recently, a projector as an image display apparatus that magnifies and projects various video images on a screen has been used widely. Such a projector has a function of condensing light emitted from a light source onto a spatial light modulation element such as a digital micromirror device (DMD) or a liquid crystal display element, and displaying exiting light from the spatial light modulation element modulated by video signals on a screen as color video images.

In order to obtain a bright and large-screen video image with the projector, conventionally, a high-brightness high-pressure mercury lamp has been used as a light source. However, when using the high-pressure mercury lamp as a light source, there are problems of a short lifetime of the light source, complex maintenance, etc.

For solving these problems, in place of the high-pressure mercury lamp, a light source device employing a solid light source such as a laser and a LED has been studied for use in an image display apparatus. The laser light source has a longer lifetime as compared with the high-pressure mercury lamp and has high directivity and light use efficiency owing to coherent light. Further, its monochromaticity makes it possible to secure a wide color reproduction range.

However, due to the high coherency of the laser light, a speckle noise is generated, which deteriorates image quality. Specifically, as to the laser light in wavelengths ranging from green to yellow where the human eye has high visibility, the decrease in image quality due to the speckle noise is a large problem. Further, although, in the LED light source, the speckle noise does not become a serious problem, a low light density of the light source due to a large light-emitting area makes it difficult to obtain a high-brightness image display apparatus.

Meanwhile, studies have been done to configure, as the solid light source other than the laser and the LED, a light source device that utilizes a light emitted from a phosphor excited by a light source such as a laser and a LED and to use the light source device in an image display apparatus. In the light source device using a phosphor, it is possible to obtain a small light-emitting area by using a laser light source capable of condensing light with high density as the excitation source. Further, even when the laser light source is used as the excitation source, a speckle noise is not generated because the fluorescence itself obtained by frequency conversion is incoherent light.

Such a light source device utilizing a phosphor is disclosed in JP 2004-341105 A and JP 2009-277516 A, for example. The devices disclosed in these documents are configured such that: a phosphor layer is disposed on a transparent disk-shaped base; excitation light is irradiated onto the phosphor layer; and fluorescence is extracted in a space on a side opposite to an excitation light source when seen from the base on which a phosphor is disposed.

However, since a large amount of fluorescence from the phosphor layer is emitted in a space on the same side as the excitation light source when seen from the base on which the phosphor is disposed, it is difficult to obtain a high-efficiency light source device by the aforementioned conventional configuration.

In contrast, for example, a configuration of the light source device shown in FIG. 10 can be considered for extracting fluorescence in the space on the same side as the excitation light source. In this light source device, a phosphor layer 101 emitting fluorescence by irradiation of excitation light is formed on one side surface of a base 100. The base 100 has a circular shape, and can be rotated with a rotation device 102. An excitation light source 103 is composed of a plurality of laser diodes emitting excitation light. The laser diode is a blue laser diode oscillating in the vicinity of a wavelength of about 445 nm.

Excitation light emitted from the excitation light source 103 is collimated by a collimator lens array 104, and enters a dichroic mirror 105. The dichroic mirror 105 is configured to transmit the excitation light from the excitation light source 103 and reflect fluorescence from the phosphor layer 101 generated by irradiation with the excitation light. Therefore, the excitation light having passed through the dichroic mirror 105 is condensed onto the phosphor layer 101 by a condenser lens 106.

A part of the excitation light irradiated onto the phosphor layer 101 is converted into fluorescence, and emitted to spaces on both sides when seen from the base 100. The fluorescence emitted in the space on the same side as the excitation light source 103 when seen from the base 100 is collimated by the condenser lens 106, reflected by the dichroic mirror 105, and passes through a dichroic mirror 110, thus exiting as output light from the light source device. Meanwhile, a part of the excitation light not having been subjected to frequency conversion is transmitted through the base 100 and reaches the space on the side opposite to the excitation light source 103. Then, the light is collimated by a condenser lens 107, reflected by reflection mirrors 108, 109 and further reflected by the dichroic mirror 110, thus exiting as output light.

Thus, by extracting fluorescence in the space on the same side as the excitation light source 103 when seen from the base 100, the fluorescence extraction efficiency can be improved. Meanwhile, since this light source device is intended to be applied in an image display apparatus, the device is configured to extract also the excitation light and utilize it as blue light, so as to emit light within the whole range of three colors of red, green and blue. In other words, a part of unconverted excitation light having been transmitted through the base 100 is ejected as output light by the optical system composed of the condenser lens 107, the reflection mirrors 108, 109 and the dichroic mirror 110. Thus, this light source device requires such an optical system dedicated to propagating blue light, which results in the complicated device configuration.

SUMMARY OF THE INVENTION

The present invention has been achieved in view of the above circumstances, and its object is to provide a light source device capable of highly efficiently extracting and propagating fluorescence emitted from a phosphor layer by irradiation of excitation light by a compact and simple optical system.

Further, the object of the present invention is to provide an image display apparatus using such a light source device.

A light source device comprising: a phosphor layer formed by disposing a phosphor on a surface of a base; and an excitation light source exciting the phosphor. A dichroic mirror is arranged between the phosphor layer and the excitation light source so as to be inclined with respect to a propagation direction of excitation light from the excitation light source. An incident region of the excitation light exiting from the excitation light source and an exiting region of fluorescence emitted from the phosphor belong to a space on the same side with respect to the surface on which the phosphor layer is disposed. In a dominant wavelength of the excitation light, the dichroic mirror has a spectral characteristic of transmitting 50% or more of light of a p-polarized component and reflecting 50% or more of light of a s-polarized component.

Here, "An incident region of the excitation light exiting from the excitation light source and an exiting region of fluorescence emitted from the phosphor belong to a space on the same side with respect to the surface on which the phosphor layer is disposed" is defined as below.

The following is assumed in an x-y-z rectangular coordinate system: the phosphor layer is arranged in a region containing an origin point of $x=y=0$ on a $z=0$ plane; the excitation light source is arranged in a $z>0$ region; and excitation light is irradiated toward a point of $x=y=z=0$. The above description defines that: at this time, the excitation light exiting from the excitation light source enters the phosphor layer from the $z>0$ region; and fluorescence emitted from the phosphor is extracted and exits to the $z>0$ region. The xy coordinates of the excitation light source are not limited particularly.

When the phosphor layer is arranged on the $z=0$ plane and excitation light is irradiated from a $z>0$ direction to the point of $x=y=0$, the intensity of fluorescence emitted from the phosphor has a light distribution close to Lambertian having peaks in positive and negative z-axis directions, and the ratio of the fluorescence emitted to the $z>0$ region is higher. Therefore, as in the present invention, by making the incident region of the excitation light and the exiting region of fluorescence emitted from the phosphor belong to the space on the same side with respect to the face of the phosphor layer, it is possible to extract and propagate fluorescence highly efficiently.

In this case, since the excitation light entering the phosphor and the fluorescence emitted from the phosphor propagate reversely in the same space, a dichroic mirror is used to extract the fluorescence and output it as output light from the light source device. By inclining the dichroic mirror, the excitation light entering the phosphor and the fluorescence emitted from the phosphor can be separated spacially.

An angle of the incident light flux with respect to the dichroic mirror is not limited particularly, and an exemplary angle suitable for simplifying the device configuration is substantially 45°.

Further, although the ratio of the p-polarized component or s-polarized component in the excitation light cannot be determined uniquely, it, for example, is 50% or more, and desirably 80% or more.

As the dichroic mirror, a characteristic of transmitting the p-polarized component and reflecting the s-polarized component in the dominant wavelength of the excitation light is selected. By configuring the dichroic mirror to have such an optical spectrum characteristic, the excitation light component also can be extracted easily in the same direction as the fluorescence, as output light from the light source device.

In other words, when the p-polarized or s-polarized excitation light is irradiated onto the substrate on which the phosphor layer is placed, the polarization direction of the excitation light component reflected by the substrate is converted, whereby the excitation light component can be extracted in the same direction as fluorescence by the dichroic mirror.

According to the present invention, by making the incident region of the excitation light and the exiting region of fluorescence emitted from the phosphor belong to the space on the same side with respect to the surface on which the phosphor layer is placed, the fluorescence on a side where a larger amount of fluorescence is emitted can be utilized effectively, whereby a compact, bright and efficient light source device can be realized.

BRIEF DESCRIPTION OF THE DRAWINGS

FIG. 1 is a configuration view of a light source device in Embodiment 1.

DETAILED DESCRIPTION OF THE INVENTION

Figure 2A:
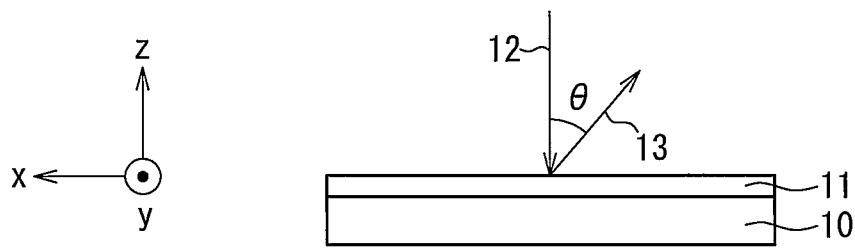
FIG. 2A is a view showing a system for explanation of an angle dependence of a fluorescence intensity.

Based on the configuration described above, a light source device of the present invention can be modified as below.

The light source device according to the present invention may be configured such that: the phosphor layer is arranged in a direction in which the excitation light entering the dichroic mirror from the excitation light source is transmitted through the dichroic mirror, and in a dominant wavelength range of the fluorescence emitted from the phosphor, the dichroic mirror has a spectral characteristic of having a high reflectance. Here, the high reflectance is 50% or more, and desirably 80% or more.

By causing the excitation light arranged in p-polarization to enter the dichroic mirror, the excitation light passes through the dichroic mirror. The excitation light having passed through the dichroic mirror is irradiated onto the phosphor layer. Fluorescence, which is generated by frequency conversion at the phosphor layer, is reflected by the dichroic mirror, and extracted as output light from the light source device.

In the frequency conversion in the phosphor, a part of the excitation light may not be frequency-converted and the light is scattered in the unconverted state. In such a scattering process in the phosphor, the polarization direction of the excitation light is disturbed. The unconverted excitation light having been reflected by the phosphor as backward scattered light reenters the dichroic mirror. Since the light contains the s-polarized component, a part thereof is reflected by the dichroic mirror and travels along the same optical path as the fluorescence, thereby being output as output light from the light source device.

Thus, according to this configuration, light simultaneously containing the excitation light component and the fluorescent component can be obtained by a simple configuration as output light from the light source device.

Further, in this configuration, it is preferable that at a position in a direction in which the excitation light entering the dichroic mirror from the excitation light source is reflected by the dichroic mirror, a polarization converter with respect to the excitation light having been reflected by the dichroic mirror and a mirror surface reflecting the excitation light having passed through the polarization converter are provided. In this configuration, the polarization converter may be a quarter wave plate with respect to the excitation light.

According to this configuration, when a part of the excitation light entering the dichroic mirror contains the s-polarized component, the s-polarized component of the excitation light is reflected by the dichroic mirror. Then, the s-polarized component is converted into circularly polarized light after passing through the polarization converter composed of the quarter wave plate, reflected by the mirror surface, and passes through the polarization converter again so as to be converted into p-polarized light this time. The p-polarized light then reenters the dichroic mirror and passes through the dichroic mirror this time, thereby being extracted as output light from the light source device.

Further, the light source device according to the present invention may be configured such that: the phosphor layer is arranged in a direction in which the excitation light entering the dichroic mirror from the excitation light source is reflected by the dichroic mirror, and in a dominant wavelength range of the fluorescence emitted from the phosphor, the dichroic mirror has a spectral characteristic of having a high transmittance. Here, the high transmittance is 50% or more, and desirably 80% or more.

By causing the excitation light arranged in s-polarization to enter the dichroic mirror, the excitation light is reflected by the dichroic mirror. The excitation light having been reflected by the dichroic mirror is irradiated onto the phosphor. Fluorescence, which is generated by frequency conversion by the phosphor, is transmitted through the dichroic mirror, and extracted as output light from the light source device.

Meanwhile, the unconverted excitation light having been reflected by the phosphor as backward scattered light reenters the dichroic mirror. Since the light contains the p-polarized component, a part thereof is transmitted through the dichroic mirror and travels along the same optical path as the fluorescence, thereby being output as output light from the light source device.

In other words, according to this configuration, light simultaneously containing the excitation light component and the fluorescent component can be obtained by a simple configuration as output light from the light source device.

Further, in this configuration, it is preferable that at a position in a direction in which the excitation light entering the dichroic mirror from the excitation light source is transmitted through the dichroic mirror, a polarization converter with respect to the excitation light having been transmitted through the dichroic mirror and a mirror surface reflecting the excitation light having passed through the polarization converter are provided. In this configuration, the polarization converter may be a quarter wave plate with respect to the excitation light.

According to this configuration, when a part of the excitation light entering the dichroic mirror contains the p-polarized component, the p-polarized component of the excitation light is transmitted through the dichroic mirror. Then, the p-polarized component is converted into circularly polarized light after passing through the polarization converter composed of the quarter wave plate, reflected by the mirror surface, and passes through the polarization converter again so as to be converted into s-polarized light this time. The s-polarized light then reenters the dichroic mirror and is reflected by the dichroic mirror this time, thereby being extracted as output light from the light source device.

Further, it is preferable that a polarization converter with respect to the excitation light is arranged between the phosphor layer and the dichroic mirror. The polarization converter may be a quarter wave plate with respect to the excitation light.

According to this configuration, it is possible to improve the efficiency of extracting the unconverted excitation light having been reflected by the phosphor as backward scattered light, as output light from the light source device.

Further, it is preferable that a condensing optical system is arranged between the phosphor layer and the dichroic mirror. This is because, since the optical spectrum characteristic of the dichroic mirror has the angle dependence, the excitation light entering the dichroic mirror desirably is a parallel light flux. Meanwhile, since the fluorescence emitted from the phosphor layer in a thin film form has a wide-ranging light distribution close to Lambertian, a spot of the excitation light to be irradiated onto the phosphor desirably is small for increasing the fluorescence extraction efficiency. In view of this, arranging the condensing optical system between the dichroic mirror and the phosphor is suitable.

Further, the excitation light source may be a laser light source oscillating in a wavelength range of blue. In this case, the phosphor may emit fluorescence containing light of a wavelength range of red, yellow or green as a main component when excited by the excitation light source.

According to this configuration, visible light such as blue light, green light, yellow light, red light and the like can be obtained as output light from the light source device, which is suitable as illumination light of an image display apparatus, etc.

Further, it is preferable that the surface of the base on which the phosphor layer is disposed is a mirror surface reflecting fluorescence. With this configuration, the fluorescence extraction efficiency is improved, whereby a high-brightness high-efficiency light source device can be obtained.

Further, it is preferable that the base can be controlled to rotate. In the frequency conversion by the phosphor, since thermal energy is generated that corresponds to a difference between the wavelength of the excitation light and the wavelength of the fluorescence, a surface temperature of the phosphor layer irradiated with the excitation light increases. As the temperature of the phosphor increases, the frequency conversion efficiency by the phosphor decreases, which is known conventionally. To cope with this, by rotating the base supporting the phosphor layer, a location in the base to be irradiated with excitation light changes with time, whereby the temperature rise of the phosphor can be suppressed and a high-efficiency light source device can be obtained.

Further, the surface of the base on which the phosphor layer is disposed is divided into two or more segments spacially. In this configuration, at least in one of the segments, the surface of the base is not provided with the phosphor layer, and is a mirror surface reflecting excitation light.

"Divided into two or more segments" as mentioned herein refers to a state in which the face in the rotational base on which the phosphor layer is placed is divided spacially into two or more segments having different characteristics, and conditions of areas to be irradiated with the spot of the excitation light are switched periodically in accordance with the rotation control correspondingly to the number of segments divided.

According to this configuration, a plurality of light beams having different spectrum characteristics can be switched with time and output from the light source device. Specifically, with respect to one segment, by setting the surface of the base as a mirror surface reflecting excitation light, the excitation light itself can be extracted highly efficiently as output light from the light source device.

Further, an image display apparatus may be configured so as to include: a light source device; a spatial light modulation element; an illumination optical system allowing light from the light source device to enter the spatial light modulation element; and a projection optical system projecting an image ejected from the spatial light modulation element onto a screen, wherein the light source device is the light source device of any of the configurations described above.

Hereinafter, a light source device in each embodiment of the present invention and an image display apparatus using the same will be described with reference to the drawings.

Embodiment 1

FIG. 1 shows a configuration of a light source device 1 in Embodiment 1. Output light of the light source device 1 contains light ranging from green to yellow as a main component and also a blue light component, and can be used as illumination light of an image display apparatus, etc.

A base 2 is a parallel plate of a glass. A dichroic coating 2a reflecting visible light highly efficiently is applied on one side surface of the base 2, and a phosphor mainly emitting green fluorescence is applied as a thin film on the dichroic coating 2a to form a phosphor layer 3. When x-y-z coordinate axes are set as shown in FIG. 1, the base 2 on which the phosphor layer 3 is formed has a circular shape in an xy plane, and can be rotated around the z-axis with a rotation device 4.

An excitation light source 5 is composed of a plurality of laser diodes 5a for obtaining a high-brightness light source device. The laser diode 5a is a blue laser diode oscillating in the vicinity of a wavelength of about 445 nm. A continuous oscillation driving at a constant current value can be used as a driving method of the laser. In the present embodiment, although a total of twenty-five laser diodes 5a are arranged in matrix (5×5), the number thereof is not limited particularly, and may be set appropriately depending on the fluorescence intensity desired to be extracted. Further, as the laser light source of blue, a laser diode directly oscillating in such wavelength range, a blue laser light source using second harmonic generation by infrared laser beams, or the like can be used.

Excitation light emitted from the excitation light source 5 is collimated by a collimator lens array 6. With respect to each of lens cells of the collimator lens array 6, one laser diode 5a is arranged. In other words, the collimator lens array 6 is composed of twenty-five lens cells. Collimator lenses are not limited to be formed as a lens array, and may be independent collimator lenses corresponding to the respective laser diodes 5a. The excitation light having passed through the collimator lens array 6 enters a dichroic mirror 7.

All of the laser diodes 5a are adjusted so that the polarization direction of the outgoing light is brought into a linearly polarized state of p-polarization shown in FIG. 1. The dichroic mirror 7 is arranged so as to be inclined by substantially 45° with respect to an optical axis of an excitation light flux from the excitation light source 5. Blue laser light from the excitation light source 5 adjusted to be p-polarized light passes through the dichroic mirror 7. The detailed functions of the dichroic mirror 7 will be described later. The excitation light passed though the dichroic mirror 7 is converted into circularly polarized light by a quarter wave plate 8, and condensed onto the phosphor layer 3 by a condenser lens 9.

A part of the excitation light irradiated onto the phosphor layer 3 is converted into green fluorescence. In the light emission by fluorescence, the light essentially is emitted uniformly in all directions. However, since phosphor powder is disposed as a thin film on the base 2, a light distribution close to Lambertian is formed due to an influence of scattering.

Figure 2B:
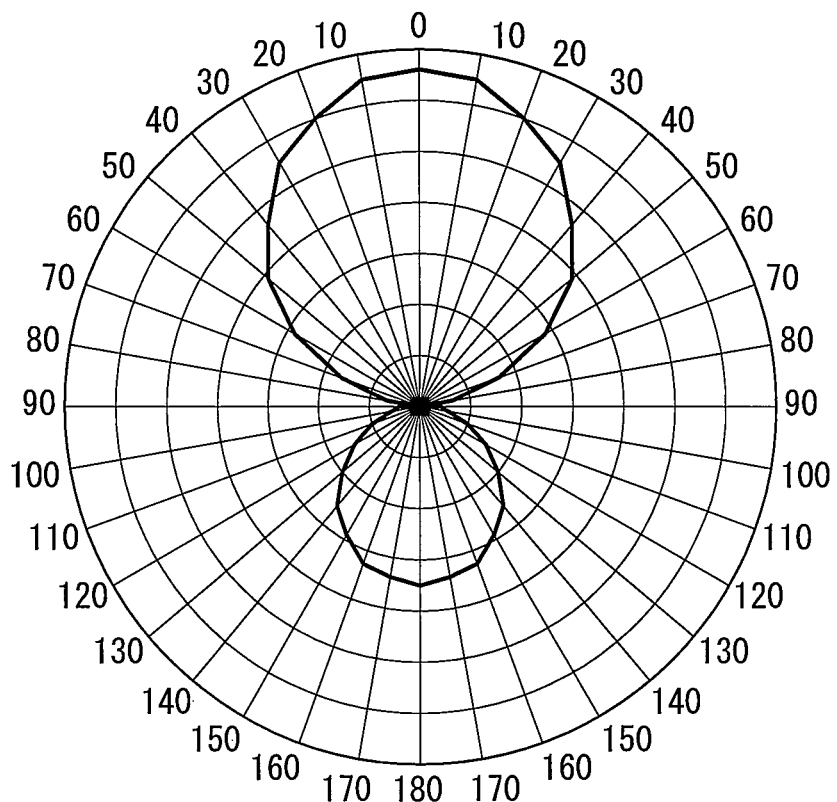
FIG. 2B is a view showing the angle dependence of the fluorescence intensity.

An exemplary light distribution of fluorescence emitted by laser light excitation will be described with reference to FIGS. 2A and 2B. As shown in FIG. 2A, a green phosphor 11 in a powder state is applied on a non-coated transparent glass substrate 10 and excited by laser light 12. Fluorescence 13 emitted at this time has a light distribution as shown in FIG. 2B. FIG. 2B shows a relationship between the fluorescence intensity and a scattering angle (angle dependence of the fluorescence intensity). Assuming that an angle formed by the laser light 12 and the fluorescence 13 when the laser light 12 (excitation light) enters the glass substrate 10 vertically is θ, the fluorescence of $0° \leq θ \leq 90°$ is a backward component and the fluorescence of $90° \leq θ \leq 180°$ is a forward component.

As can be seen from FIG. 2B, the fluorescence 13 contains both of the forward and backward components, and the intensity of the backward component is relatively larger than that of the forward component. Therefore, in order to extract the fluorescence 13 efficiently, the fluorescent component is desired to be gathered on the backward side only. Therefore, in the present embodiment, as shown in FIG. 1, in order to gather the fluorescence 13 on the backward side only, the dichroic coating 2a for reflecting fluorescence is provided on the base 2 so as to be opposed to the excitation light source 5 when seen from the phosphor layer 3.

The light emitted from the phosphor layer 3 to a space of $z \leq 0$ is reflected by a face of the dichroic coating 2a. Consequently, green fluorescence is present only in a space of a $z \geq 0$ region, and has a light distribution close to Lambertian that exhibits the highest intensity in the positive z-axis direction.

The condenser lens 9 with respect to the excitation light functions as a collimator lens with respect to the green fluorescence emitted from the phosphor layer 3. A collimator optical system composed of the condenser lens 9 preferably is an optical system at least capable of efficiently capturing fluorescence emitted at the angle of $0° \leq θ \leq 60°$ when using the scattering angle θ in FIG. 2, and more preferably is an optical system capable of capturing fluorescence of up to about $0° \leq θ \leq 80°$, so as to obtain a higher-efficiency light source device.

The green fluorescence extracted effectively and collimated by the condenser lens 9 passes through the quarter wave plate 8, then is reflected by the dichroic mirror 7 and exits as output light from the light source device 1.

The functions of the dichroic mirror 7 are based on the following characteristics. Since the dichroic mirror 7 is arranged so as to be inclined substantially 45° with respect to the optical axis of the excitation light flux from the excitation light source 5, in the wavelength range of the excitation light source 5, the mirror 7 has a characteristic of attaining high transmission with respect to p-polarized light and high reflection with respect to s-polarized light. In other words, in the dominant wavelength of the excitation light, the dichroic mirror 7 has a spectral characteristic of transmitting 50% or more of light of a p-polarized component and reflecting 50% or more of light of a s-polarized component. Meanwhile, in the wavelength range of the fluorescence from the phosphor layer 3, the dichroic mirror 7 has a characteristic of attaining high reflection, regardless of the p-polarized light or the s-polarized light.

Figure 3:
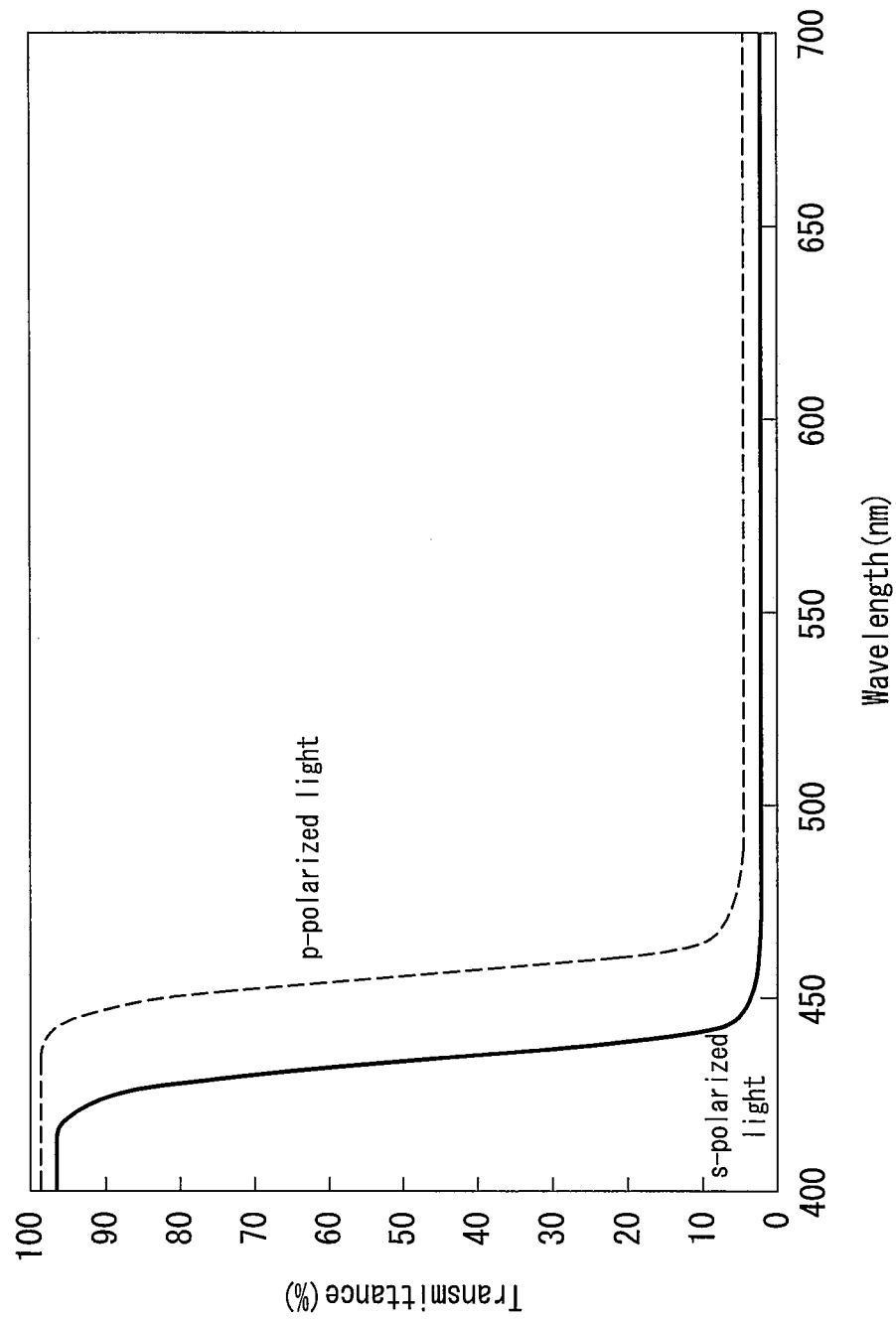
FIG. 3 is a graph showing transmission spectra of a dichroic mirror at an incident angle of 45° that is used in the light source device of Embodiment 1.

FIG. 3 shows exemplary transmission spectra of the dichroic mirror 7 at an incident angle of 45°. Two plots respectively indicate the transmittance of the s-polarized light (solid line) and the transmittance of the p-polarized light (broken line). In a wavelength range from purple to blue, the transmittance of the dichroic mirror 7 is 90% or more, which is high transmission. In a wavelength range from blue to red, the reflectance of the dichroic mirror 7 is 90% or more, which is high reflection. Cutoff wavelengths where the transmittance becomes 50% are 434 nm for the s-polarized light and 456 nm for the p-polarized light, respectively. That is, the cutoff wavelength for the p-polarized light is longer by about 22 nm as compared with the s-polarized light. Thereby, as described above, the blue laser light from the excitation light source 5 adjusted to be p-polarized light passes through the dichroic mirror 7. Meanwhile, the green fluorescence emitted from the phosphor layer 3 is reflected by the dichroic mirror 7.

In the frequency conversion by the phosphor, not all of the excitation light is converted into fluorescence, and a part of the excitation light remains as unconverted light. In the case where excitation light enters the phosphor layer 3 in the z=0 plane from the space of the z≥0 region in the present embodiment, unconverted excitation light is scattered forward and backward by the phosphor layer 3. The forward scattered light that is emitted to the space of z≤0 is reflected by the face of the dichroic coating 2a and added to a backward scattered component of z≥0 consequently, thereby reentering the condenser lens 9.

The unconverted excitation light extracted effectively and collimated by the condenser lens 9 passes through the quarter wave plate 8, and then enters the dichroic mirror 7.

Since the unconverted excitation light, which is extracted as backward scattered light, is scattered by the phosphor layer 3, the polarization state is disturbed with respect to the incident light to the phosphor layer 3. However, the polarization does not become perfectly random and maintains its polarization at the time of entering the phosphor layer 3 to some extent. Because of this, the remaining excitation light having passed through the quarter wave plate 8 twice in both ways and having reentered the dichroic mirror 7 contains the higher ratio of the s-polarized component than the p-polarized component. Therefore, more than half of the remaining excitation light is reflected by the dichroic mirror 7, and can be extracted as output light from the light source device 1. Thus, by insertion of the quarter wave plate 8, the efficiency of extracting the remaining excitation light can be improved by a simple method.

In the above description, although the material of the base 2 is a glass, it preferably is made of a material having a high thermal conductivity because the phosphor loses efficiency under high temperature. For example, instead of using a glass, a metal base made of aluminum, copper or metals mainly containing these may be used and a surface thereof is formed into a mirror surface, on which the phosphor is applied. By cutting and polishing the surface of the metallic base with high precision, the surface finishing for obtaining a mirror surface state can be realized. The mirror surface finishing also can be obtained by depositing a thin metallic film layer on the surface of the metallic base by a method of vacuum evaporation, plating, etc.

By rotating the base 2, a spot to be irradiated with excitation light can be changed with time, whereby the temperature rise of the phosphor can be suppressed. The rotation speed is not limited particularly, and may be 3000 rpm or more and 20000 rpm or less, for example.

When the disk-shaped base 2, on which the phosphor layer is disposed, is controlled to rotate, the phosphor layer 3 can be irradiated with excitation light constantly, even when the base 2 rotates along the z-axis, since the phosphor layer 3 is formed on an entire area surface in a circumferential direction of the base 2.

A power of the collimator lens array 6 and a power of the condenser lens 9 are adjusted so that all the beams emitted from the plurality of laser diodes 5a are present within a spot diameter equal to or less than a certain size on the phosphor layer 3. For example, a group of twenty-five excitation light beams on the phosphor layer 3 is adjusted to have a spot diameter of about φ2 mm. In FIG. 1, although the condenser lens 9 is composed of two lenses in one group, it may be composed of one lens, or three or more lenses.

The production method of the phosphor layer 3 is not limited particularly, and examples thereof include a precipitation method, a printing method, a molding method, etc. The type of the phosphor is not limited particularly, but desirably is a phosphor absorbing blue excitation light efficiently and emitting fluorescence efficiently while having high resistance with respect to temperature quenching. In one example according to the present embodiment, $Y_3Al_5O_{12}$:Ce3+ is used as a green phosphor. Examples of other phosphors capable of being excited by a blue laser of the wavelength of 445 nm and emitting green fluorescence include: $(Ba, Sr)_2SiO_4$:Eu2+, $SrSi_2O_2N_2$:Eu2+, $Ba_3Si_6O_{12}N_2$:Eu2+, $Sr_2Al_3Si_{13}N_{23}$:Eu2+, β-SiAlON:Eu2+.

It should be noted that the above-mentioned phosphors are given as exemplary phosphors for obtaining the light of the aforementioned wavelength range, and phosphors applicable in the present invention are not limited to these.

An appropriate thickness of the phosphor layer 3 is not limited particularly because it varies depending on the type of the phosphor to be applied and its application method. However, the average thickness preferably is one time or more of the average particle size of the phosphor powder. When the thickness of the phosphor layer 3 is too small, the number of phosphors contributing to the frequency conversion becomes deficient, which makes it difficult to obtain high frequency conversion efficiency.

Further, the wavelength of the excitation light is not limited to the blue laser in the vicinity of 445 nm. However, in view of the excitation efficiency of the phosphor and the color rendering property at the time of using the excitation light itself as blue illumination light, the wavelength of the excitation light preferably is 440-470 nm.

The present embodiment explains the case in which blue laser light is used as the excitation light source and green fluorescence is extracted as output light. However, the wavelength ranges of the excitation light and the fluorescence are not limited particularly, and may be selected appropriately depending on the purpose.

As described above, according to the present embodiment, a compact light source device capable of extracting visible light highly efficiently can be obtained by a simple configuration.

Embodiment 2

Figure 4:
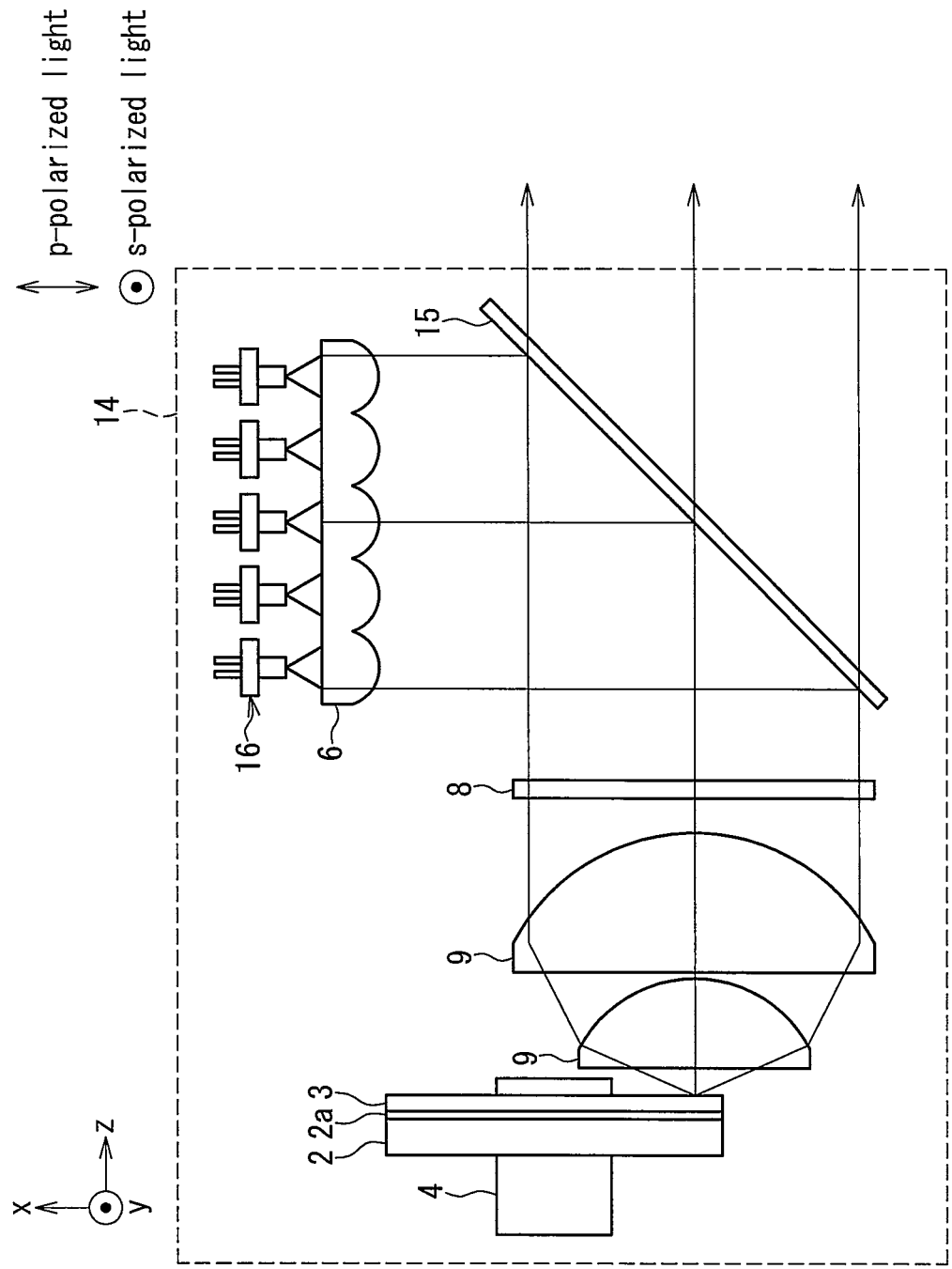
FIG. 4 is a configuration view of a light source device in Embodiment 2.

FIG. 4 shows a configuration of a light source device 14 in Embodiment 2. Output light of the light source device 14 contains light ranging from green to yellow as a main component and also a blue light component, and can be used as illumination light of an image display apparatus, etc.

Although the constituent elements of the light source device 14 substantially are similar to those in Embodiment 1, the optical spectrum characteristic of a dichroic mirror 15 is different from that of the dichroic mirror in Embodiment 1. Accordingly, the arrangement of the elements is different from Embodiment 1. In the following description, the same elements as those in Embodiment 1 are given the same reference numerals, and the repeated descriptions will be omitted.

An excitation light source 16 and the phosphor layer 3 used in the present embodiment are the same as those in Embodiment 1. However, outgoing light from the excitation light source 16 is adjusted to be s-polarized light. The dichroic mirror 15 is arranged so as to be inclined at substantially 45° with respect to the optical axis of the excitation light flux. Excitation light entering the dichroic mirror 15 is reflected by the dichroic mirror 15 and condensed onto the phosphor layer 3. Meanwhile, fluorescence emitted from the phosphor layer 3 is transmitted through the dichroic mirror 15 and exits as output light from the light source device 14.

Figure 5:
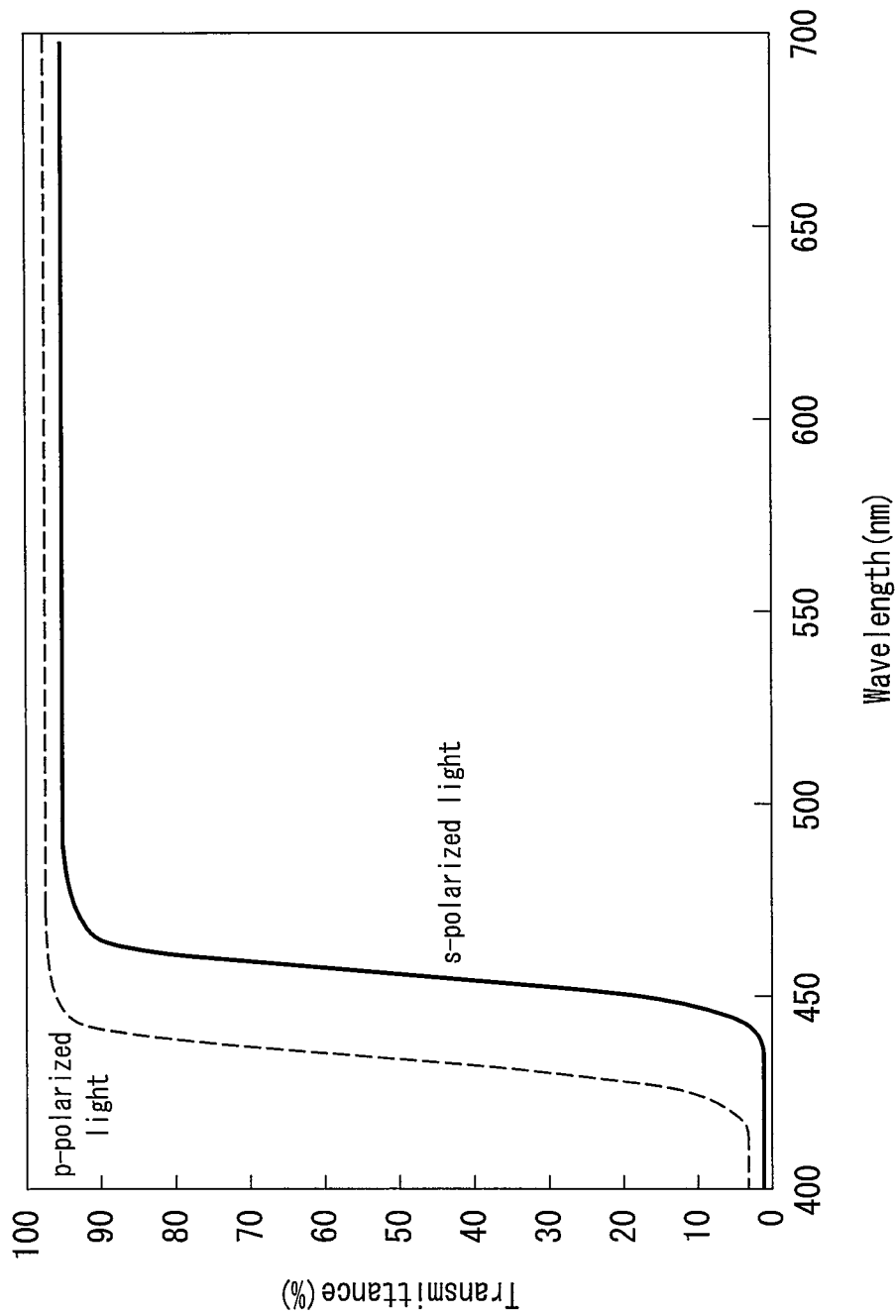
FIG. 5 is a graph showing transmission spectra of a dichroic mirror at an incident angle of 45° that is used in the light source device of Embodiment 2.

FIG. 5 shows transmission spectra of the dichroic mirror 15 used in the present embodiment. Two plots respectively indicate the transmittance of s-polarized light (solid line) and the transmittance of p-polarized light (dotted line). In a wavelength range of the excitation light source 16, the dichroic mirror 15 attains high transmission with respect to the p-polarized light and high reflection with respect to the s-polarized light. In a wavelength range of fluorescence emitted from the phosphor layer 3, the dichroic mirror 15 attains high transmission, regardless of the p-polarized light or the s-polarized light. In the wavelength range of purple-blue, the reflectance of the dichroic mirror 15 is 90% or more, which is high reflection. In the wavelength range from blue to red, the transmittance of the dichroic mirror 15 is 90% or more, which is high transmission. The cutoff wavelengths where the transmittance becomes 50% are 456 nm for the s-polarized light and 434 nm for the p-polarized light, respectively. That is, the p-polarized light is shorter by about 22 nm as compared with the s-polarized light.

By adopting such a configuration, it is possible to provide a compact light source device capable of extracting high-efficiency visible light by a simple method. Since the output light from the light source device obtained in the present embodiment is equivalent to the output light obtained in Embodiment 1, a more suitable configuration can be selected in view of constraints in the arrangement of elements, etc.

Embodiment 3

A light source device in Embodiment 3 will be described with reference to FIGS. 6A and 6B. Since the present embodiment is equivalent to the configuration of Embodiment 1 expect for a phosphor layer part formed on the base, the illustration of the entire configuration of the light source device will be omitted. The descriptions regarding the same elements will be omitted. Output light from the light source device of the present embodiment contains light ranging from green to yellow, red light as main components and a blue light component, and can be used as illumination light of an image display apparatus, etc.

Figure 6A:
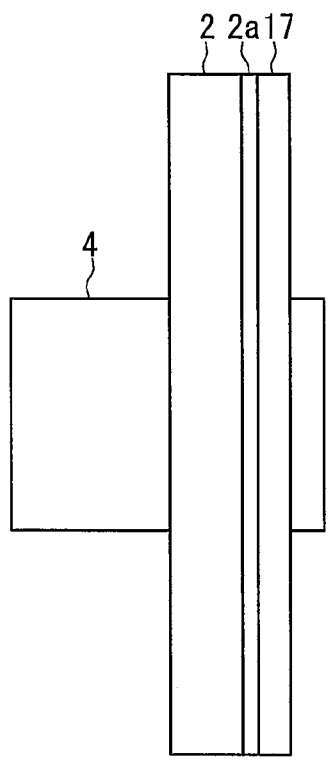
FIG. 6A is a side view showing a configuration of a base on which a phosphor layer of a light source device of Embodiment 3 is provided and a periphery of the base.
Figure 6B:
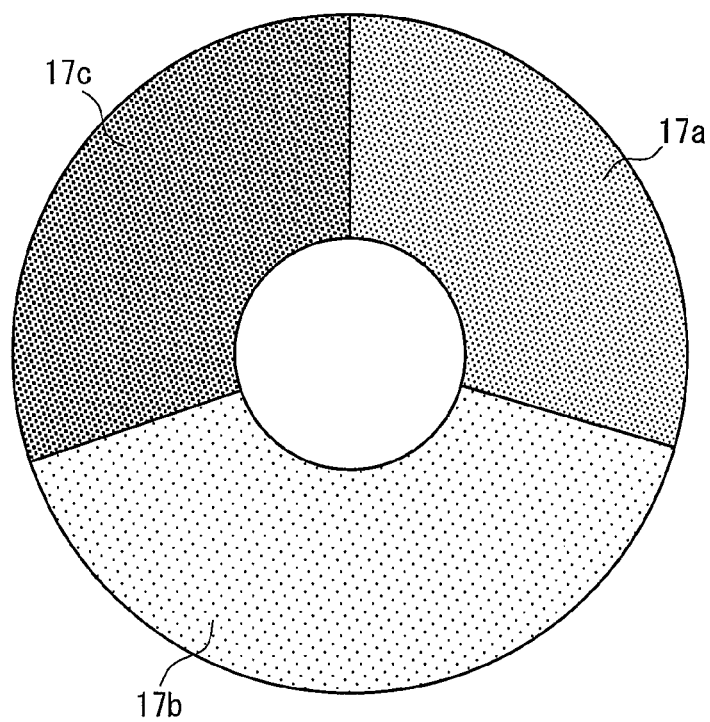
FIG. 6B is a front view of the base.

As shown in FIG. 6A, although a configuration composed of the base 2, the dichroic coating 2a, and the rotation device 4 is identical to that of Embodiment 1, a configuration of a phosphor layer 17 formed on the dichroic coating 2a is different from that of Embodiment 1. Specifically, in the present embodiment, as shown in FIG. 6B, a surface of the disk-shaped base 2 is divided into three segments 17a, 17b and 17c, and a phosphor layer is formed on two of these segments. A red phosphor is applied on the segment 17a, and a green phosphor is applied on the segment 17b. No phosphor, but a reflection coating with respect to excitation light is applied on the segment 17c, so as to form a mirror surface.

With this configuration, when the base 2 is rotated around the z-axis, the position of the spot to be irradiated with excitation light is changed with time across the three segments. When the segment 17a faces a condensed spot of excitation light, blue excitation light is converted into red light by the red phosphor. Similarly, when the segment 17b faces the condensed spot of excitation light, blue excitation light is converted into green light by the green phosphor.

Meanwhile, when the segment 17c faces the condensed spot of excitation light, blue excitation light is reflected by the surface of the base 2 without being subjected to frequency conversion, and passes through the quarter wave plate 8 again via the condenser lens 9 (see FIG. 1) so as to be converted into linearly polarized light of s-polarization. Further, the light is reflected by the dichroic mirror 7 and exits from the light source device 1. In the two segments 17a and 17b on which the phosphors are applied, the converted green fluorescence and red fluorescence also are reflected by the dichroic mirror 7 and exits from the light source device. Therefore, in a time average, it is possible to obtain output light obtained by additive color mixing of red, green and blue from the light source device.

Examples of the phosphor capable of being excited by the blue laser of the wavelength of 445 nm and emitting red fluorescence include: $CaAlSiN_3$:Eu2+, $Sr_2Si_5N_8$:Eu2+, $SrAlSi_4N_7$:Eu2+. It should be noted that these phosphors are given as exemplary phosphors for obtaining the light of the aforementioned wavelength range, and phosphors applicable in the present invention are not limited to these.

By selecting a suitable division ratio (division angle) between the three segments 17a, 17b and 17c based on values of the frequency conversion efficiency from the excitation light to the respective fluorescence, the intensity ratio of red light, green light and blue light is adjusted, whereby white light having a superior color rendering property can be obtained. This is suitable as a light source for use in an image display apparatus such as a projector.

Further, in order to obtain output light having a superior color rendering property by a configuration based on the present embodiment, the face in the base 2 to be irradiated with excitation light may be divided into four or more segments. For example, the base of the light source device may be composed of four segments, whose faces are coated with a red phosphor, a green phosphor, a yellow phosphor and no phosphor, respectively.

Embodiment 4

Figure 7:
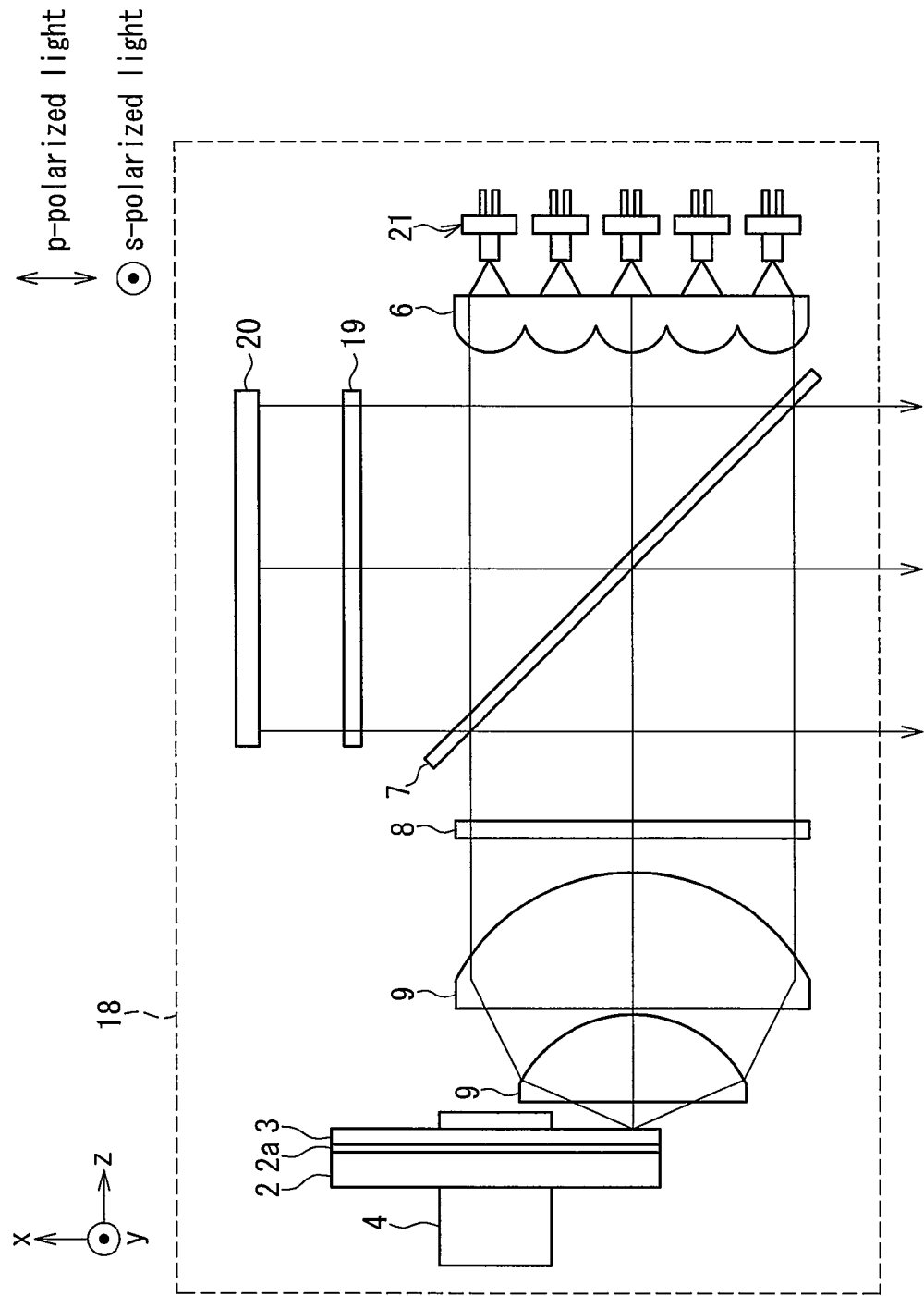
FIG. 7 is a configuration view of a light source device in Embodiment 4.

FIG. 7 shows a configuration of a light source device 18 in Embodiment 4. The present embodiment is configured by adding a quarter wave plate 19 and a reflection mirror 20 to the configuration of Embodiment 1. The same elements as those in Embodiment 1 are given the same reference numerals, and the repeated descriptions will be omitted.

In the present embodiment, the excitation light from a laser of the wavelength of 445 nm exiting from an excitation light source 21 mainly contains the p-polarized component, but contains a slight amount of the s-polarized component. Because of this, most of the excitation light entering the dichroic mirror 7 passes though the dichroic mirror 7, but a part of the excitation light of the s-polarized component is reflected by the dichroic mirror 7.

The excitation light having been reflected by the dichroic mirror 7 is converted into circularly polarized light by the quarter wave plate 19, reflected by the reflection mirror 20 arranged at an incident angle of 0° (normal incidence), passes through the quarter wave plate 19 again reversely so as to be converted into p-polarized light, and reenters the dichroic mirror 7. Since the excitation light converted into the p-polarized light passes though the dichroic mirror 7 this time, it travels along the same optical path as fluorescence emitted from the phosphor layer 3 spacially, and is output from the light source device 18.

By adopting the configuration such as that described in the present embodiment, even when the s-polarized component is mixed in the excitation light, it is possible to extract the excitation light efficiently from the light source device as a part of the output light.

Similarly, also in the device configuration described in Embodiment 2, by adding the quarter wave plate and the reflection mirror in the transmission direction of the dichroic mirror 15 with respect to excitation light, it is possible to provide a light source device essentially equivalent to the configuration described in the present embodiment.

Embodiment 5

Figure 8:
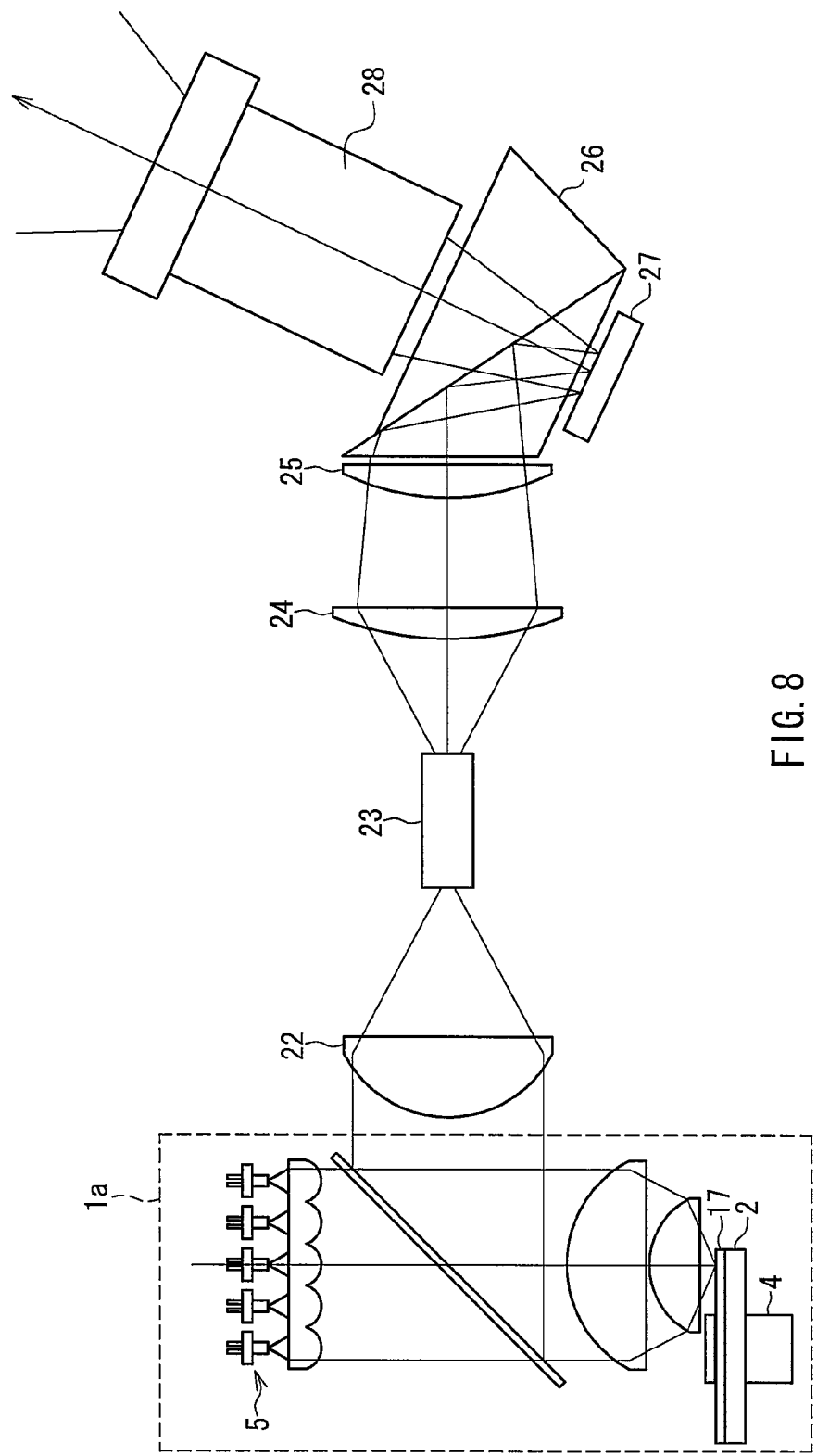
FIG. 8 is a configuration view of an image display apparatus in Embodiment 5.

FIG. 8 shows a configuration of an image display apparatus in Embodiment 5. This image display apparatus makes use of a light source device 1a having a configuration described in Embodiment 3.

Output light from the light source device 1a is condensed by a condenser lens 22 and enters a rod integrator 23. Since the light is fully-reflected at a side surface of the rod integrator 23, output light with uniform illuminance can be obtained as outgoing light from the rod integrator.

The light exiting from the rod integrator 23 passes through a relay lens 24, a field lens 25 and a total internal reflection prism 26, and thereafter enters a DMD 27 (image display element). A relay optical system is configured so that a shape of an exiting surface of the rod integrator 23 is transferred onto the DMD 27 and light is condensed thereon efficiently and uniformly.

The DMD 27 is composed of micro mirrors arranged two-dimensionally. Each mirror changes its inclination in accordance with video input signals of red, green and blue so as to form signal light modulated with time. The drive of the DMD 27 is controlled to be synchronized with the turning of the segments 17a, 17b and 17c (see FIG. 6B) of the phosphor layer 17 by the rotation of the base 2 of the light source device 1a.

In other words, for example, the timing of the rotation device 4 is controlled so that when the DMD 27 is driven by a video signal of red, in the light source device 1a, the excitation light is irradiated onto the segment 17a and red light is emitted from the red phosphor. Similarly, the timing of the rotation device 4 is controlled so that when the DMD 27 is driven by a video signal of green and when the DMD 27 is driven by a video signal of blue, the excitation light is irradiated onto the segment 17b and the segment 17c, respectively. The signal light modulated by the DMD 27 is projected onto a screen (not shown) by a projection lens 28.

By configuring the image display apparatus described in the present embodiment, it is possible to provide a compact and efficient image display apparatus.

Embodiment 6

Figure 9:
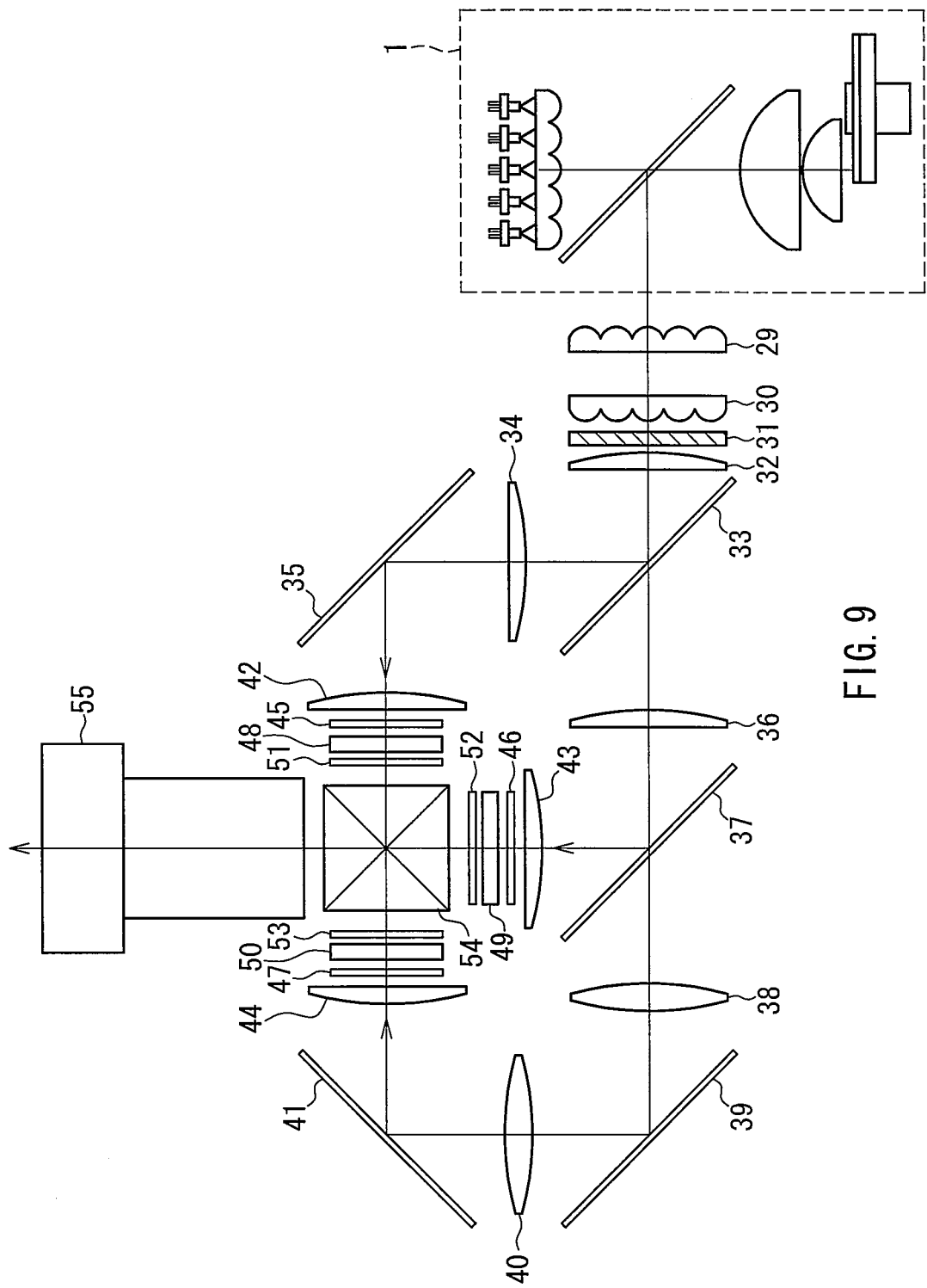
FIG. 9 is a configuration view of an image display apparatus in Embodiment 6.
Figure 10:
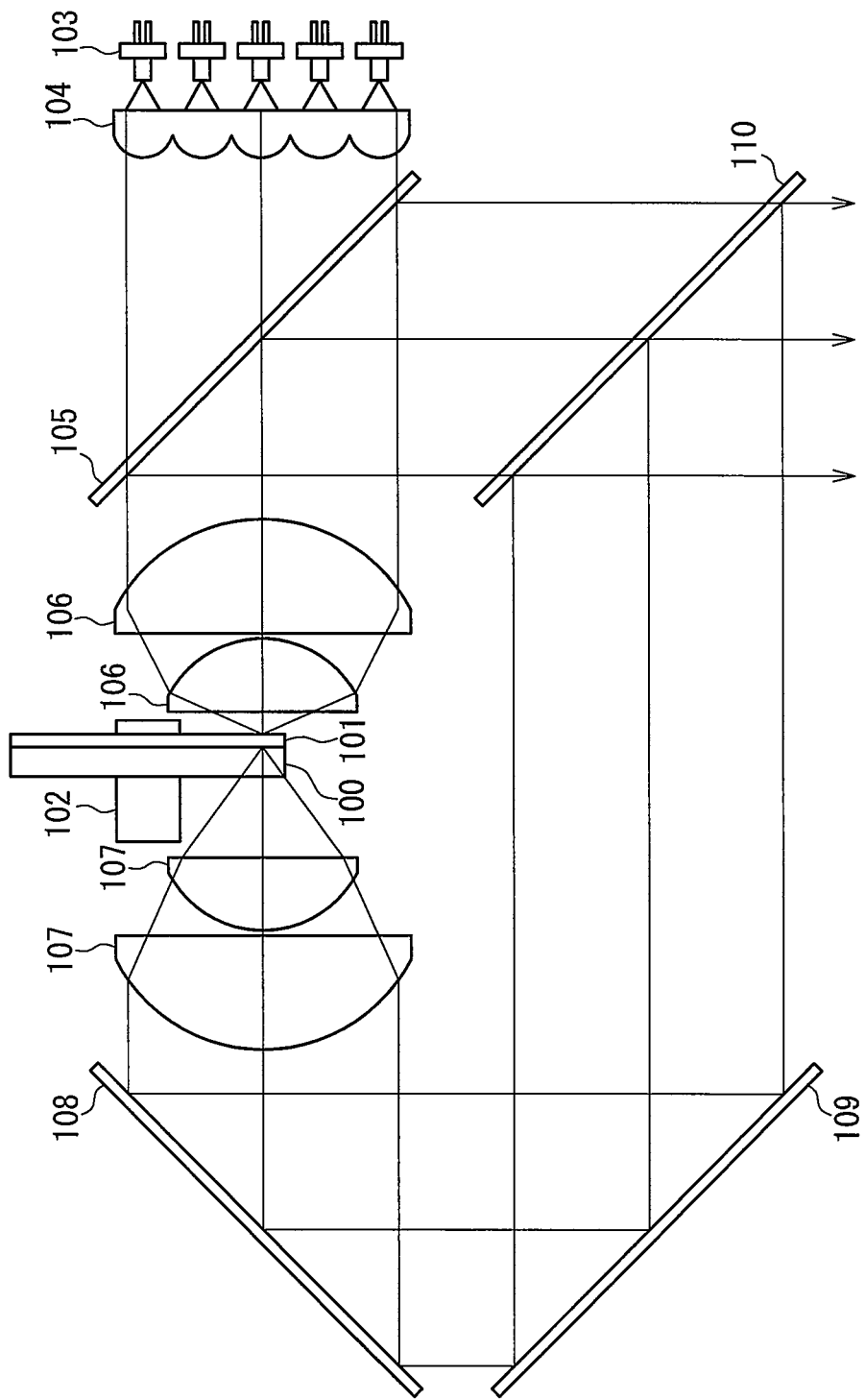
FIG. 10 is a configuration view showing a part of a light source device according to a conventional example.

FIG. 9 shows a configuration of an image display apparatus in Embodiment 6. This image display apparatus is composed using the light source device 1 in Embodiment 1.

Output light from the light source device 1 passes through a first integrator lens array 29, a second integrator lens array 30, a polarization converter 31 and a condenser lens 32, and then is separated per wavelength range spacially.

In other words, a dichroic mirror 33 has a characteristic of reflecting blue light and transmitting a light ranging from green to red. The blue light having reflected by the dichroic mirror 33 passes through a relay lens 34, a reflection mirror 35, a field lens 42 and an incident-side polarizing plate 45, and thereafter enters a liquid crystal display element 48 for blue.

Among the light having passed through the dichroic mirror 33 and a relay lens 36, green fluorescence is reflected by a dichroic mirror 37, passes through a field lens 43 and an incident-side polarizing plate 46, and thereafter enters a liquid crystal display element 49 for green.

On the other hand, red light having been transmitted through the dichroic mirror 37 enters a liquid crystal display element 50 for red via relay lenses 38, 40, reflection mirrors 39, 41, a field lens 44, and an incident-side polarizing plate 47.

Signal lights that are modulated in accordance with input video signals by the liquid crystal display elements 48, 49 and 50 pass through output-side polarizing plates 51, 52, 53, respectively, and enter a cross dichroic prism 54. The modulated signal lights of three colors of red, green, and blue are multiplexed spacially by the cross dichroic prism 54, and projected onto a screen (not shown) by a projection lens 55.

By configuring the image display apparatus described in the present embodiment, it is possible to provide a compact and efficient image display apparatus.

What is claimed is:

1. A light source device comprising: a phosphor layer formed by disposing a phosphor on a surface of a base; and an excitation light source exciting the phosphor,
    wherein a dichroic mirror is arranged between the phosphor layer and the excitation light source so as to be inclined with respect to a propagation direction of excitation light from the excitation light source,
    an incident region of the excitation light exiting from the excitation light source and an exiting region of fluorescence emitted from the phosphor belong to a space on the same side with respect to the surface on which the phosphor layer is disposed, and
    in a dominant wavelength of the excitation light, the dichroic mirror has a spectral characteristic of transmitting 50% or more of light of a p-polarized component and reflecting 50% or more of light of a s-polarized component.

2. The light source device according to claim 1,
    wherein the phosphor layer is arranged in a direction in which the excitation light entering the dichroic mirror from the excitation light source is transmitted through the dichroic mirror, and
    in a dominant wavelength range of the fluorescence emitted from the phosphor, the dichroic mirror has a spectral characteristic of having a high reflectance.

3. The light source device according to claim 2, wherein at a position in a direction in which the excitation light entering the dichroic mirror from the excitation light source is reflected by the dichroic mirror, a polarization converter with respect to the excitation light having been reflected by the dichroic mirror and a mirror surface reflecting the excitation light having passed through the polarization converter are provided.

4. The light source device according to claim 3, wherein the polarization converter is a quarter wave plate with respect to the excitation light.

5. The light source device according to claim 1,
wherein the phosphor layer is arranged in a direction in which the excitation light entering the dichroic mirror from the excitation light source is reflected by the dichroic mirror, and
in a dominant wavelength range of the fluorescence emitted from the phosphor, the dichroic mirror has a spectral characteristic of having a high transmittance.

6. The light source device according to claim 4, wherein at a position in a direction in which the excitation light entering the dichroic mirror from the excitation light source is transmitted through the dichroic mirror, a polarization converter with respect to the excitation light having been transmitted through the dichroic mirror and a mirror surface reflecting the excitation light having passed through the polarization converter are provided.

7. The light source device according to claim 6, wherein the polarization converter is a quarter wave plate with respect to the excitation light.

8. The light source device according to claim 1, wherein a polarization converter with respect to the excitation light is arranged between the phosphor layer and the dichroic mirror.

9. The light source device according to claim 8, wherein the polarization converter is a quarter wave plate with respect to the excitation light.

10. The light source device according to claim 1, wherein a condensing optical system is arranged between the phosphor layer and the dichroic mirror.

11. The light source device according to claim 1, wherein the excitation light source is a laser light source oscillating in a wavelength range of blue.

12. The light source device according to claim 1, wherein the phosphor emits fluorescence containing light of a wavelength range of red, yellow or green as a main component when excited by the excitation light source.

13. The light source device according to claim 1, wherein the surface of the base on which the phosphor layer is disposed is a mirror surface reflecting fluorescence.

14. The light source device according to claim 1, wherein the base can be controlled to rotate.

15. The light source device according to claim 14, wherein the surface of the base on which the phosphor layer is disposed is divided into two or more segments spacially.

16. The light source device according to claim 15, wherein at least in one of the segments, the surface of the base is not provided with the phosphor layer, and is a mirror surface reflecting excitation light.

17. An image display apparatus, comprising
a light source device;
a spatial light modulation element;
an illumination optical system allowing light from the light source device to enter the spatial light modulation element; and
a projection optical system projecting an image ejected from the spatial light modulation element onto a screen,
wherein the light source device is the light source device according to claim 1.

* * * * *